United States Patent [19]

Sheldon

[11] Patent Number: 5,870,834
[45] Date of Patent: Feb. 16, 1999

[54] SIX-AXIS METROLOGY SENSOR DEVICE

[75] Inventor: Paul C. Sheldon, Mequon, Wis.

[73] Assignee: Sheldon/Van Someren, Inc., Wauwatosa, Wis.

[21] Appl. No.: 735,102

[22] Filed: Oct. 22, 1996

[51] Int. Cl.⁶ ............................ G01B 5/004; G01B 7/004
[52] U.S. Cl. ................................ 33/556; 33/502; 33/503; 74/479.01
[58] Field of Search ............................ 33/556, 1 M, 502, 33/503, 558, 559, 561; 74/479.01; 73/866.5; 483/1; 409/201, 132, 235; 403/157

[56] References Cited

U.S. PATENT DOCUMENTS 5,489,168  2/1996  Sheldon et al. ...................... 409/235
5,571,222  11/1996  Ludwig ...................... 33/503

*Primary Examiner*—Christopher M. Fulton
*Attorney, Agent, or Firm*—Robert A. Van Someren

[57] ABSTRACT

A metrology device determines the position of a machine component relative to a datum along three linear and three rotational axes. The metrology device has a pair of support structures connected by six legs that are each disposed at an angle with respect to the next adjacent leg. One of the support structures can be connected to the datum and the other can be connected to the machine component. A sensor cooperates with each leg to sense the actuation of that leg as the support structures move relative to one another. The combination of signals provided by the legs can be used to track movement of the machine component relative to the datum.

20 Claims, 4 Drawing Sheets

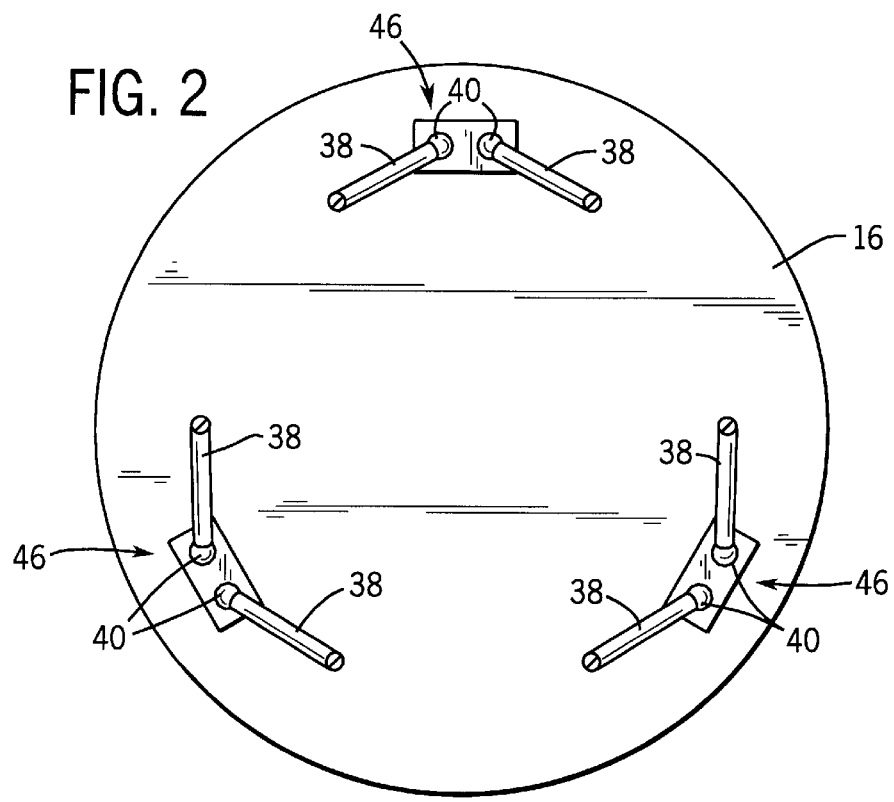
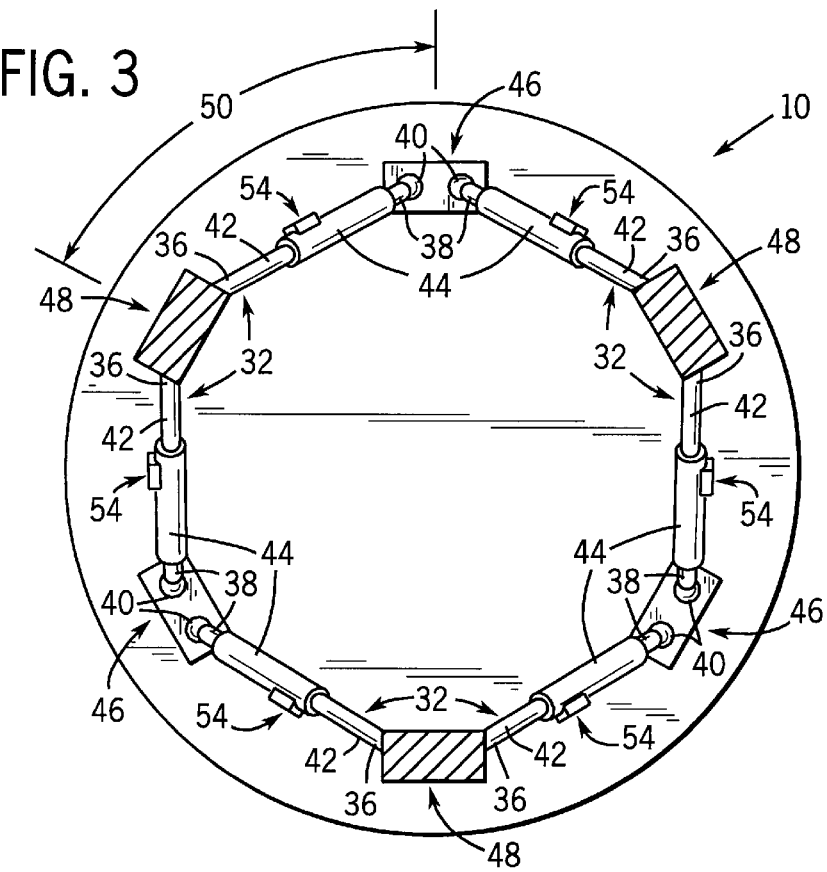

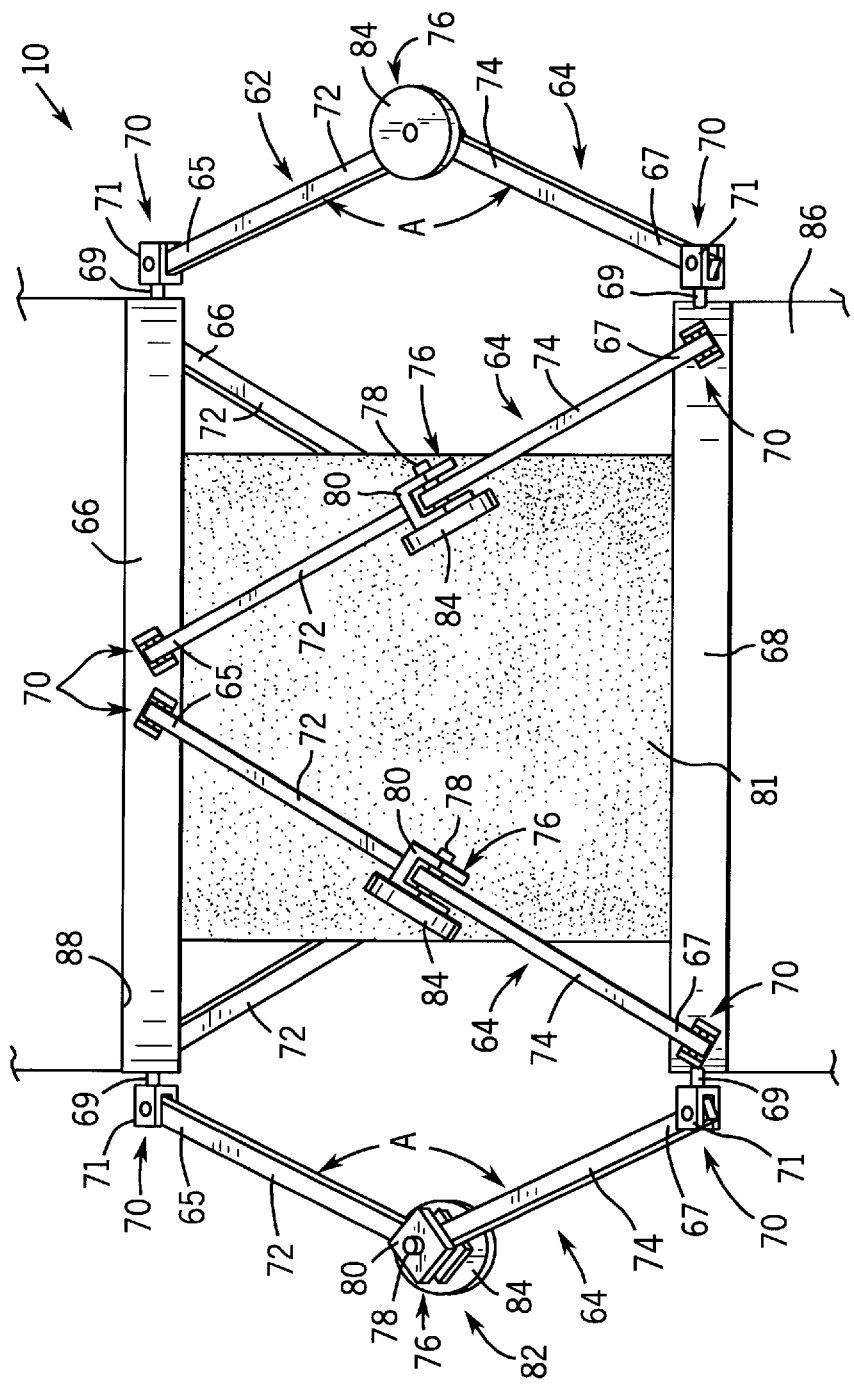

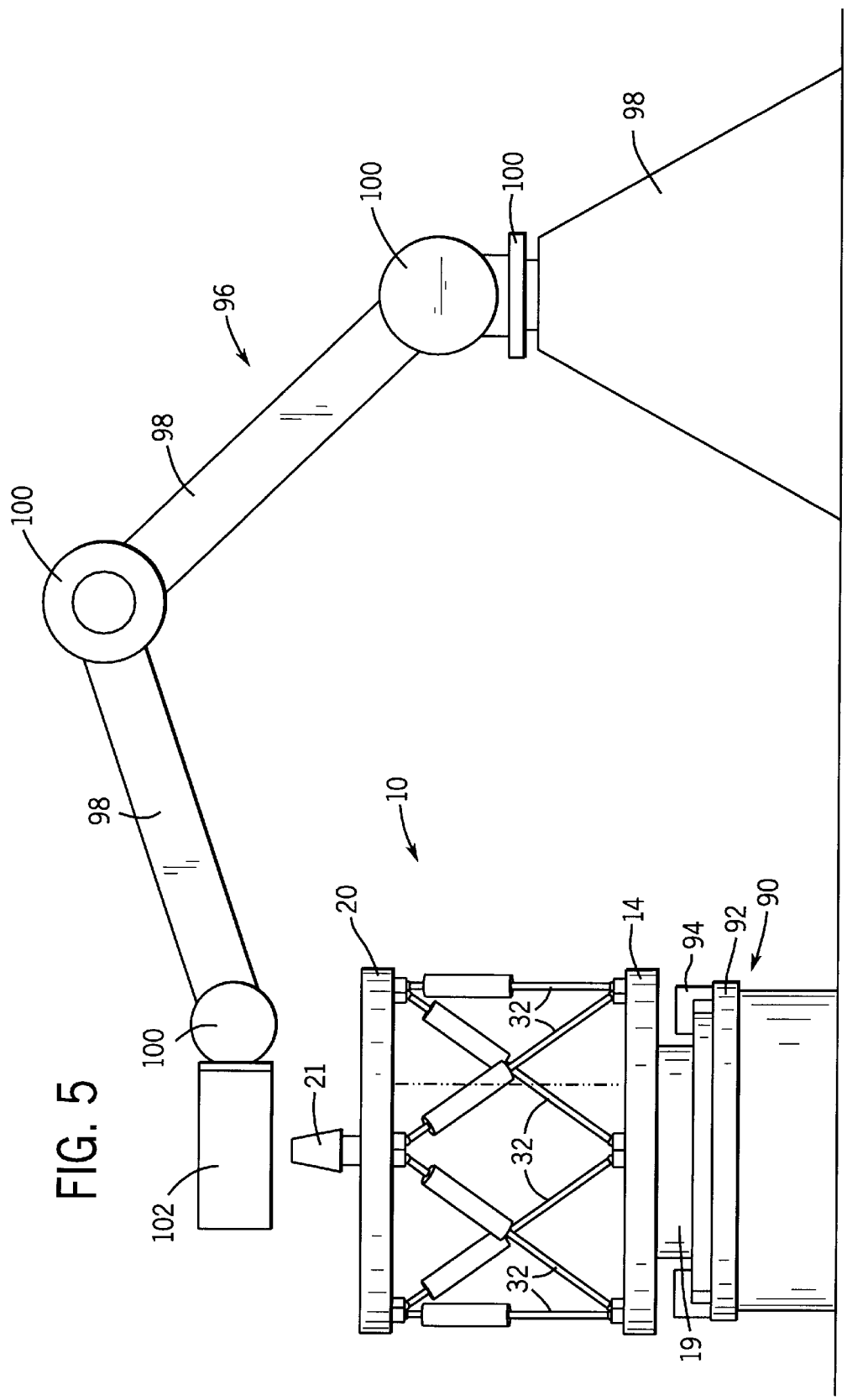

SIX-AXIS METROLOGY SENSOR DEVICE

This document is generally related to the patent application entitled Multi-Axis Continuous Probe, Ser. No. 08/707,128, filed on Sep. 3, 1996.

FIELD OF THE INVENTION

The present invention relates generally to a metrology device, and particularly to a six-axis sensor able to sense movement of a machine component along six axes.

BACKGROUND OF THE INVENTION

A variety of metrology devices are used with machines, such as machine tools or robotic machines, to discover errors in positioning of a moveable device, e.g., a tool that interacts with a workpiece. For example, in U.S. Pat. No. 5,489,168 a system is disclosed that is permanently attached to a six-axis machine tool to verify position of the tool being used, independently of the sensor system on the machine's actuator legs. This allows an operator or controller to determine errors in the positions indicated to the machine's control system, and to compensate for those errors Conventionally, the accuracy of a machine, such as a machine tool, has been verified by machining sample parts that are then mounted to a coordinate measuring machine (CMM) which probes select locations on the workpiece to determine deviation from the desired part parameters. If errors exist, the machine tool can be adjusted to compensate for those errors. Many other machines, such as robotic arms, also require verification of positional accuracy of the tool or other object to ensure precision and accuracy of operation. Some of these machines are able to move an object with six degrees of freedom as defined by the standard linear axes, x, y and z as well as the standard rotational axes a, b and c. Therefore, a six-axis metrology device is necessary to verify the accuracy of the machines movement along all six axes.

In some situations, a CMM having an arm constructed of pivotable and rotatable serial links is used to determine errors in positioning of, for instance a tool. Sensors are used to indicate the movement of each serial link relative to the next adjacent link, and the combination of signals can be used to track the movement along all six axes of one end of the arm relative to a datum at its opposite end. One problem with this type of system is that any errors in the CMM itself are additive due to the serial linking of moveable components. It would be advantageous to have the sensors connected in parallel rather than serially to provide an averaging of errors rather than an adding of errors in the device itself. Such a device could be used to verify the accuracy of the CMM arm or, in appropriate cases, to replace the CMM arm.

In many applications, it also would be advantageous to have a six-axis metrology device that could be connected to the machine to discover any errors in the positioning of the machine's moveable component, e.g., tool and then disconnected and removed prior to operation of the machine. In the case of a machine tool, for example, this would permit the accuracy of the machine and its control system to be tested prior to machining sample parts for verification of dimensions on a CMM. It would also obviate the need for constructing a permanent metrology device with each machine.

Furthermore, regardless of whether the metrology device is permanently or removably mounted to the machine being tested, telescopic sensor legs, such as those disclosed in the '168 patent, are sometimes vulnerable to static friction. The inherent nature of telescopic components requires that a certain amount of stick, sometimes known as stiction, must be overcome when movement first occurs. Some precise measurement operations, particularly in applications where the movement of the metrology device is repeatedly started and stopped, would benefit from reduced stiction.

The present invention addresses the foregoing drawbacks of existing metrology devices and methods of determining positional errors in machines.

SUMMARY OF THE INVENTION

A preferred embodiment of the present invention features a metrology device for determining the position of a moveable machine component relative to a datum along a plurality of axes. The metrology device includes a first structure that may be removably connected to a datum structure. The metrology device further includes a second structure having a connector configured to be attached to the moveable machine component. At least six legs are connected between the first structure and the second structure. Each of the legs is pivotably connected to the first structure and to the second structure. A plurality of sensors are arranged to measure movement of the second structure relative to the first structure along the three linear axes and the three rotational axes. Preferably, an individual sensor is connected to each of the six legs to sense the movement of that leg and to provide a signal indicative of the movement.

In an alternative embodiment of the invention each leg has two members connected at a hinge joint. This permits the moving members of each leg to rotate rather than slide with respect to each other, thereby reducing stiction.

According to another aspect of the invention, a method is provided for constructing and installing a metrology device able to sense the movement of a machine component having up to six degrees of freedom of motion. The method includes the steps of preparing a first structure for positioning at a datum and preparing a second structure having a connector to which a movable machine component can be connected. The first structure and the second structure are connected by at least six legs that permit movement of the second structure relative to the first structure with up to six degrees of freedom. The method further includes the step of positioning a plurality of sensors to sense movement of the second structure relative to the first structure.

BRIEF DESCRIPTION OF THE DRAWINGS

The invention will hereafter be described with reference to the accompanying drawings, wherein like reference numerals denote like elements, and:

FIG. 2 is a cross sectional view of the metrology device taken generally along line 2—2 of FIG. 1;

FIG. 3 is a cross sectional view of the metrology device taken generally along line 3—3 of FIG. 1;

FIG. 4 is a front view of an alternate embodiment of a metrology device according to the present invention; and FIG. 5 is a schematic view showing an embodiment of the present invention used in cooperation with a robotic arm.

DETAILED DESCRIPTION OF THE PREFERRED EMBODIMENT

Figure 1:
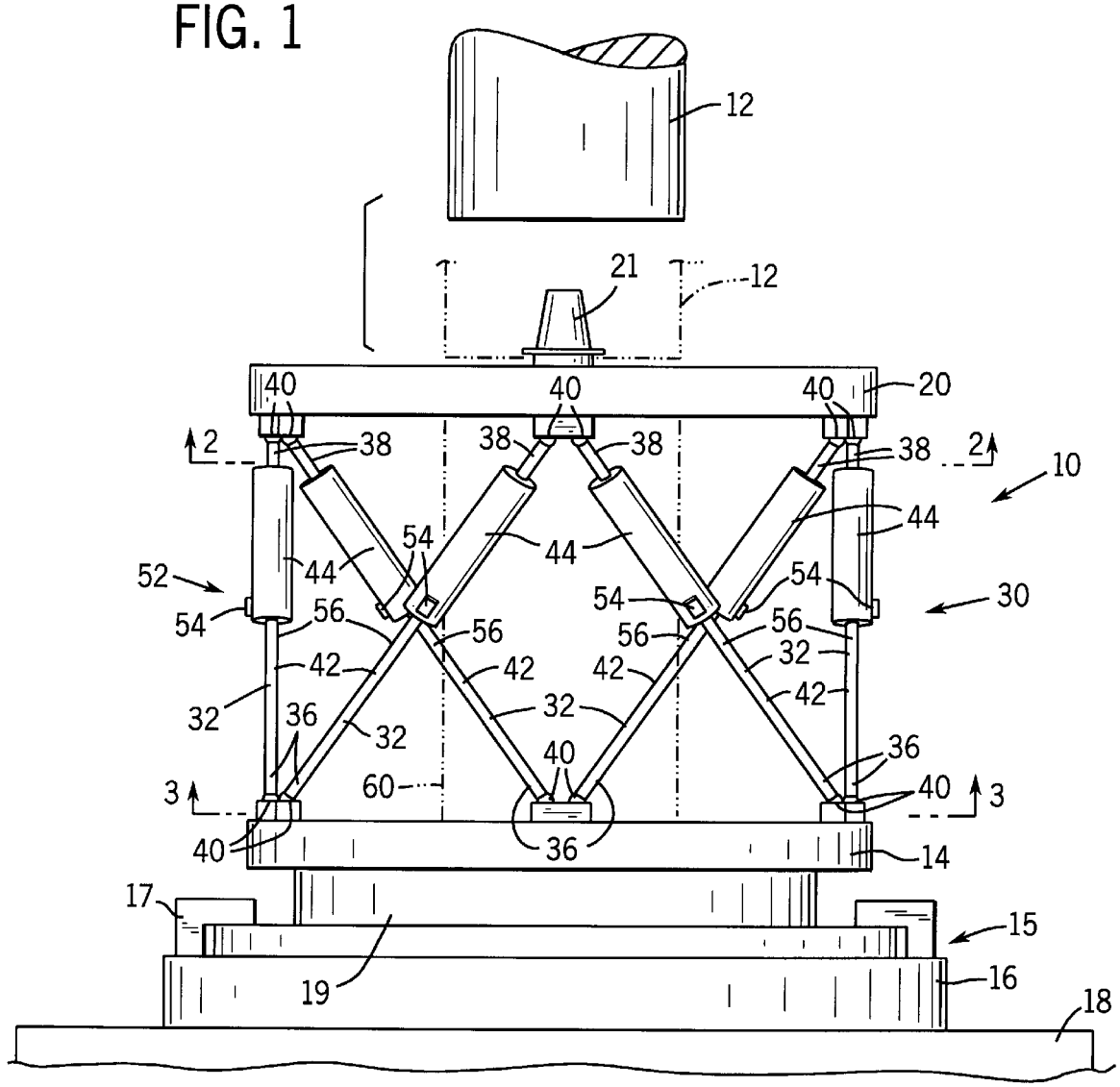
FIG. 1 is a front view of a metrology device according to a preferred embodiment of the present invention.
Figure 1:
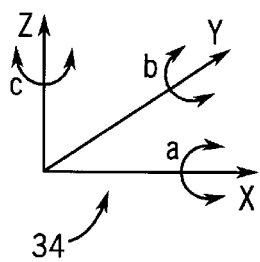

Referring generally to FIGS. 1–3, a metrology device 10, according to a preferred embodiment of the invention, is illustrated. Metrology device 10 can be used to discover errors in positioning of a moveable component 12 in a variety of machines, such as robotic arms or machine tools.

Metrology device 10 includes a first structure 14 than can be mounted to a datum, such as datum structure 15. In the illustrated embodiment, datum structure 15 is a fixture 16 having a clamping mechanism 17 as would be used to mount a workpiece on a machine tool 18. First structure 14 includes an appropriate mounting connector 19 designed for removable mounting to datum structure 15, e.g. fixture 16. However, depending on the machine to be tested, first structure 14 can be configured for removable mounting to any of a variety of datums.

Metrology device 10 also includes a second structure 20 having a connector 21 that can be removably connected to movable component 12. Connector 21 can have a variety of configurations depending on the type of machine to which it is selectively connected. In the illustrated embodiment, movable component 12 is a machine tool spindle and connector 21 is a generally truncated cone shaped extension comparable to the base of a cutting tool that would be mounted in the machine tool spindle.

Second supporting structure 20 is connected to first structure 14 by a linkage assembly 30. Linkage assembly 30 permits second structure 20 to move with respect to first structure 14. In the illustrated embodiment, linkage assembly 30 includes a plurality of legs 32, preferably six legs, that permit second structure 20 to move with six degrees of freedom relative to first structure 14. The six degrees of freedom can be defined by the three linear axes x, y, z and the three rotational axes a, b, c, as illustrated by a diagram 34 in FIG. 1.

Each leg 32 includes a first end 36 pivotably mounted to the first structure 14 and a second end 38 pivotably mounted to second structure 20. First ends 36 and second ends 38 can be pivotably mounted to the first structure 14 and the second structure 20, respectively, by pivot mounts 40, such as ball and socket mounts or trunnion joints. Each leg 32 is designed to permit its first end 36 to move towards or away from its second end 38 as second structure 20 is moved with respect to first structure 14. To accommodate this movement, each leg 32 includes a first component 42 slideably engaged with a second component 44. For example, second component 44 could be a cylinder having an opening therethrough and first component 42 could be a rod slideably received in the opening for telescopic extension and retraction.

At a minimum, the pivot mount 40 on one end of each leg 32 should permit pivotable movement with at least two degrees of freedom, while the pivot mount 40 at the other end of each leg 32 should permit pivotable movement with at least three degrees of freedom. Alternatively, the pivot mounts 40 at both ends of each leg 32 should permit pivotable movement with at least two degrees of freedom, while first component 42 is permitted to rotate relative to second component 44 about a common axis.

Legs 32 can be connected between first structure 14 and second structure 20 in several different orientations. However, a preferred orientation is illustrated in FIGS. 1–3 in which adjacent legs 32 are angled with respect to each other to form triangular patterns with first structure 14 or second structure 20. In the illustrated embodiment, pairs of second ends 38 are attached proximate one another to second structure 20 at three locations 46, as best illustrated in FIG. 2. Similarly, the first ends 36 are connected proximate one another to first structure 14 at three locations 48, as best illustrated in FIG. 3. As also shown in FIG. 3, locations 48 are offset from second structure locations 46 by an angle 50, that would typically be approximately 60 degrees.

A sensor system 52, including a plurality of sensors 54, senses when second structure 20 moves with respect to first structure 14. Ultimately, sensor system 52 tracks the movement of connector 21 and movable component 12 relative to a datum such as the fixture 16 to which a workpiece would be mounted.

Preferably an individual sensor 54 is attached to each leg 32 to provide a signal indicative of the distance between its first end 36 and its second end 38. The combination of signals from the six sensors 54 can be used to mathematically calculate the exact position of connector 21 and thus movable component 12 relative to the desired datum in all six degrees of freedom, i.e., along all three linear axes x, y, z and all three rotational axes a, b, c. In other words, the position of the movable component 12 (attached to connector 21) relative to the datum structure 15 is always known, and any movement of component 12 is sensed along all six axes. Thus, the accuracy of the machine can be tested and the errors determined at select locations of movable 25 component 12 or continuously as component 12 is moved with respect to datum structure 15.

A variety of sensors 54 can be used to sense the sliding extension and retraction of each leg 32. For example, sensors 54 can include readheads and linear scales or LVDTs. In the illustrated embodiment, each leg 32 constitutes an LVDT 56. Alternatively, sensors could be connected to pivot mounts 40 to determine the angle and thus the position of each leg 32.

Optionally, second structure 20 is biased away from first structure 14 by a resilient member 60 as shown by dashed lines. Resilient member 60 can be a foam rubber member disposed between and in contact with first structure 14 and second structure 20 between legs 32. However, numerous other resilient members, such as coil springs, could be used to bias the first structure 14 and the second structure 20 away from each other. The use of resilient member 60 prevents linkage 30 from collapsing when metrology device 10 is disconnected from movable component 12 and/or datum structure 15.

In FIG. 4, another embodiment of metrology device 10 is illustrated with a different linkage assembly 62 in which components are rotatably rather than slidably coupled to each other. Among other things, this design takes advantage of the reduction in stiction associated with certain slidably engaged components. Linkage assembly 62 includes a plurality of (preferably six) legs 64 with each leg being hinged. Each leg 64 includes a first end 65 pivotably connected to first structure 66 and a second end 67 pivotably connected to second structure 68. The first end 65 and second end 67 of each leg 64 can be mounted to the first structure 66 and the second structue 68, respectively, by a pivot member 70 having two degrees of freedom. For example, each pivot member 70 can include a shaft 69 rotatably mounted to a side of the first structure 66 or the second structure 68. A trunnion 71 is mounted to the shaft 69 for pivotably receiving an end of the corresponding leg 64.

First end 65 is part of a first link 72 of each leg 64. Similarly, second end 67 is part of a second link 74 of each leg 64. First links 72 are pivotably connected to corresponding second links 74 at hinge joints 76. In an exemplary embodiment of hinge joint 76, a pin 78 is affixed to second link 74 and rotatably mounted to a clevis 80 affixed to first link 72. Optionally, a resilient member 81, such as the illustrated foam rubber between structures 66 and 68 or a coil spring, can be used to bias structures 66 and 68 away from each other.

A sensor system 82 includes a plurality of sensors 84 that sense the movement of second structure 68 with respect to first structure 66. This permits calculation of the exact position of a moveable machine component 86 relative to a desired datum 88. As described above, this precise positional calculation is possible because moveable component 86 is integral with, attached or removably attached to second structure 68 at a constant position with respect to second structure 68 during use of metrology device 10. Similarly, first structure 66 is integral with, attached or removably attached to datum 88 and remains at a constant position with respect to datum 88 during use of metrology device 10.

In a preferred embodiment, sensors 84 comprise angle position sensors, e.g. encoders, attached to clevis 80 of each leg 64 for cooperation with pin 78. Thus, any changes in the angle A formed between the first link 72 and the second link 74 of each leg is sensed. The angles A formed by the six legs 64 can be used to calculate the position of second structure 68 with respect to first structure 66, and thus the position of movable component 86 relative to datum 88. Alternatively, sensors could be applied to various combinations of the pivot joints 70 to determine position.

Referring to FIG. 5, one potential use of an embodiment of metrology device 10 is illustrated. In this embodiment, metrology device 10 is generally of the type illustrated and described with reference to FIGS. 1–3. Accordingly, the same reference numerals will be used in FIG. 5 to denote similar elements to those in FIGS. 1–3.

In this particular use, first structure 14, via mounting connector 19, is mounted to a datum structure 90. Datum structure 90 includes a fixture 92 having a mechanism 94 that securely holds metrology device 10 at a location normally occupied by the object or workpiece undergoing a desired operation by a robotic arm 96.

In the illustrated embodiment, robotic arm 96 includes a plurality of links 98 that are connected in series by several rotational joints 100. As with typical robotic arms, the combination of joints and serial links permits movement of a tool handling mechanism 102 along multiple axes, often up to movement along all six axes. To control movement of tool handling mechanism 102, conventional robotic arms include a sensor system that senses movement of the various joints and provides feedback signals to a controller which is then able to calculate the current position of tool handling mechanism 102 and control its movement to subsequent commanded positions.

However, due to a variety of reasons, including inaccurate sensing and mechanical wear of the various robotic arm components, errors can develop in the positioning of tool handling mechanism 102. Thus, periodically it is necessary to determine whether such errors exist in the movement and positioning of tool handling mechanism 102. Metrology device 10 can be connected as shown to discover those errors along any of the potential axes of movement.

Specifically, metrology device 10 is mounted to datum structure 90 and tool handling mechanism is attached to connector 21. The robotic arm 96 and metrology device 10 typically are first zeroed at a predetermined location relative to datum structure 90. Then, tool handling mechanism 102 is moved along predetermined paths to established locations to determine whether the actual movement of tool handling mechanism 102 deviates from the established control program. If the errors or deviations from the established control program are within acceptable tolerances, metrology device 10 can be removed to permit normal operation of robotic arm 96 until the next error test.

It will be understood that the foregoing description is of a preferred exemplary embodiment of this invention and that the invention is not limited to the specific forms shown. For example, a variety of sensors can be used to sense the position and movement of the structures along up to six axes. Additionally, numerous types of machines and reference structures can be used in cooperation with the metrology device, and the connectors can be of several types depending on the particular application. These and other modifications may be made in the design and arrangement of the elements without departing from the scope of the invention as expressed in the appended claims.

What is claimed is:

1. A metrology device for determining, along a plurality of axes, the position of a movable machine component relative to a datum, comprising:

a first structure that may be removably connected to a datum structure;

a second structure having a connector configured to be connected to the movable machine component;

at least six legs, each leg being pivotably connected to the first structure and the second structure, wherein the datum structure is on an opposite side of the first structure from the at least six legs and the movable machine component is on an opposite side of the second structure from the at least six legs;

a plurality of sensors arranged to measure movement of the second structure relative to the first structure potentially along three linear axes and three rotational axes; and a biasing mechanism to bias the first structure away from the second structure.

2. The metrology device as recited in claim 1, wherein each leg is pivotably connected to the first structure and to the second structure by ball and socket joints.

3. The metrology device as recited in claim 1, wherein each leg is disposed at an angle with respect to the next adjacent leg.

4. The metrology device as recited in claim 1, wherein the legs comprise a plurality of extensible legs.

5. The metrology device as recited in claim 4, wherein the plurality of sensors includes an LVDT sensor integrally constructed with each leg.

6. The metrology device as recited in claim 4, wherein each extensible leg includes a scale and readhead.

7. The metrology device as recited in claim 1, wherein the legs comprise a plurality of hinged legs that each includes a pair of links pivotably engaged at a hinge joint.

8. The metrology device as recited in claim 7, wherein each hinged leg is pivotably connected to the first structure and to the second structure by a pair of trunnion joints.

9. The metrology device as recited in claim 8, wherein the plurality of sensors includes an angular measurement sensor mounted to each leg to sense the angle formed by the pair of links.

10. The metrology device as recited in claim 1, wherein the plurality of sensors includes a sensor connected to each of the legs.

11. A metrology device for determining, along a plurality of axes, the position of a movable machine component relative to a datum, comprising:

a first structure that may be attached to a datum structure;

a second structure that may be attached to the movable machine component;

a plurality of legs, each leg having a first link pivotably connected to the first structure and a second link pivotably connected to the second structure, wherein the first link is pivotably connected to the second link at a joint such that the first link pivots with respect to the second link when the distance between the first structure and the second structure changes; and a plurality of sensors arranged to measure movement of the second structure relative to the first structure potentially along the three linear axes of motion and the three rotational axes of motion.

12. The metrology device as recited in claim 11, wherein the plurality of legs includes six legs.

13. The metrology device as recited in claim 12, wherein each leg is pivotably connected to the first structure by a trunnion joint and to the second structure by a trunnion joint.

14. The metrology device as recited in claim 11, wherein the first link is approximately equal in length to the second link.

15. The metrology device as recited in claim 11, wherein the plurality of sensors includes a plurality of angular position sensors connected to select legs.

16. The metrology device as recited in claim 15, wherein the plurality of angular position sensors includes six angular position sensors with a single angular position sensor attached to each leg to detect the angular position of the first link with respect to the second link.

17. The metrology device as recited in claim 16, wherein the plurality of angular position sensors includes a plurality of encoders.

18. A method for constructing and installing a metrology device able to sense the movement of a movable machine component having up to six degrees of freedom of motion, comprising the steps of:

preparing a first structure for positioning at a datum member such that the first structure may be attached and detached from the datum member;

preparing a second structure with a connector designed to be selectively connected and disconnected from the movable machine component;

connecting the first structure to the second structure with at least six legs that permit movement of the second structure relative to the first structure with up to six degrees of freedom; and positioning a plurality of sensors to sense when the second structure moves relative to the first structure.

19. The method as recited in claim 18, further comprising the step of attaching the connector to the movable machine component.

20. The method as recited in claim 19, further comprising the step of removably coupling the first structure to a datum structure.

* * * * *